United States Patent [19]

Tsipouras

[11] 4,104,907
[45] Aug. 8, 1978

[54] INDICATED HORSEPOWER MEASUREMENT SYSTEM FOR PISTON ENGINES

[75] Inventor: Panayiotis J. Tsipouras, Rocky River, Ohio

[73] Assignee: Megasystems, Inc., Cleveland, Ohio

[21] Appl. No.: 735,591

[22] Filed: Oct. 26, 1976

[51] Int. Cl.² .......................................... G01M 15/00
[52] U.S. Cl. .................................................. 73/117.3
[58] Field of Search ....................... 73/116, 117.3, 115

[56] References Cited
U.S. PATENT DOCUMENTS

| | | | |
|---|---|---|---|
| 3,375,711 | 4/1968 | Ives et al. ........................... | 73/115 X |
| 3,815,410 | 6/1974 | Brown, Jr. et al. .................... | 73/115 |

FOREIGN PATENT DOCUMENTS

2,247,890  4/1974  Fed. Rep. of Germany .......... 73/117.3

Primary Examiner—Jerry W. Myracle
Attorney, Agent, or Firm—Woodling, Krost, Granger and Rust

[57] ABSTRACT

An electronic measurement system for monitoring and measuring indicated horsepower (IHP) of piston type engines which may be spark-ignition, diesel, steam or other power type, based on two or more cycles of operation. Indicated horsepower (IHP) is computed for each engine cylinder in sequential fashion and is based on measurements of cylinder pressure and crankshaft angle of rotation versus time. The system hereof is also operable to measure revolutions per minute of the engine shaft, as well as combustion and compression pressures (just before ignition).

8 Claims, 11 Drawing Figures

INDICATED HORSEPOWER MEASUREMENT SYSTEM FOR PISTON ENGINES

BACKGROUND OF THE INVENTION

Cylinder power measurements are normally based on the P-V (pressure vs. volume) diagram. Heretofore, particularly on low speed engines the P-V diagram has been plotted by a mechanical "indicator" device to provide a graphic readout. For relatively high speed engines this mechanical device is inaccurate due to the inertia of its moving parts and hence is not reliable. Instead the cylinder pressure is oftentimes measured by an electronic transducer and the "volume" parameter is derived from the crankshaft angle of rotation via a so-called "rotary function generator". Once the P-V diagram is obtained the area corresponding to the work performed is measured by means of a "planimeter" or other suitable instrument which requires manual computation. Both prior art approaches require extensive manual involvement and therein lie the disadvantages.

The disclosed measurement system of the present invention eliminates the various manual operations required of prior art systems, and further provides a continuous output corresponding to the horsepower of the selected cylinder. As will be also hereinafter apparent the present system may be part of a larger microprocessor based system which can automatically acquire and display the measurements for all cylinders of a given engine.

From the following disclosure of a preferred embodiment of the measurement system of the present invention, the system objectives hereof are as follows:

The instant measurement system is intended to measure the compression and combustion pressures and the indicated horsepower of each cylinder at periodic time intervals;

It will accommodate any piston-type engine with up to 16 cylinders driving a common crankshaft;

It will be operable to measure the crankshaft RPM;

All measurements for a particular cylinder are to be available as continuous voltage signals so that compatible analog indicators may be used; and Measurements by the present system are possible in both the "forward" and "reverse" running engine modes.

BASIC CONCEPTS OF POWER MEASUREMENT OF THE PRESENT INVENTION

The following brief mathematic concept defines the computations to be performed by the electronic circuitry of the measurement system hereof and is essential to an understanding of the circuit behavior.

Nomenclature

Let $P(t)$ = pressure inside cylinder vs. time.

Let $X(t)$ = linear position of piston in cylinder.

Let $(t)$ = linear velocity of piston vs. time.

Let $A$ = area of piston cross section.

1. The work done by the piston as it moves by an infinitesimal amount $dx(t)$ is = $dE(t) = A \cdot P(t) \cdot dx(t) = A \, P(t) \cdot v(t) \, dt$.

2. The total amount of work done during one complete revolution is: ($T$ = period of revolution)

$$E_T = \int_o^T dE(t) = \int_o^T A \cdot P(t) \cdot \sim (t) dt$$

3. The average power "W" during one revolution is defined as:

$$W = \frac{E_T}{T} = \frac{1}{T} \int_o^T A \cdot P(t) \cdot \sim (t) dt = A\left(\frac{1}{T} \int_o^T P(t) \cdot \sim (t) dt \right)$$

From the equation for the average power (3) it is realized that the following operations must be performed by the circuitry of the present system:

(a) Measure $P(t)$ and $v(t)$ (b) Multiply $P(t)$ and $v(t)$ (c) Pass the result of multiplication through a low pass filter (d) Adjust the scale factor based on "A" and other circuit constants.

Measurement of $P(t)$ is performed with a piezoelectric type of transducer.

The piston velocity cannot be measured directly, instead it is derived by the system from measurements of the crankshaft angle "$\phi(t)$" and angular velocity "$w(t)$" according to the relation:

$$\sim(t) = -R \cdot w(t)\sin\phi \left(1 - \frac{\cos\phi}{\sqrt{\left(\frac{L}{R}\right)^2 - \sin^2\phi}}\right)$$

where:
 $L$ = length of connecting rod
 $R$ = crankshaft radius
The angle "$\phi$" in the above equation is zero when the piston is in its lowest position.

DESCRIPTION OF PREFERRED EMBODIMENT

Figure 1:
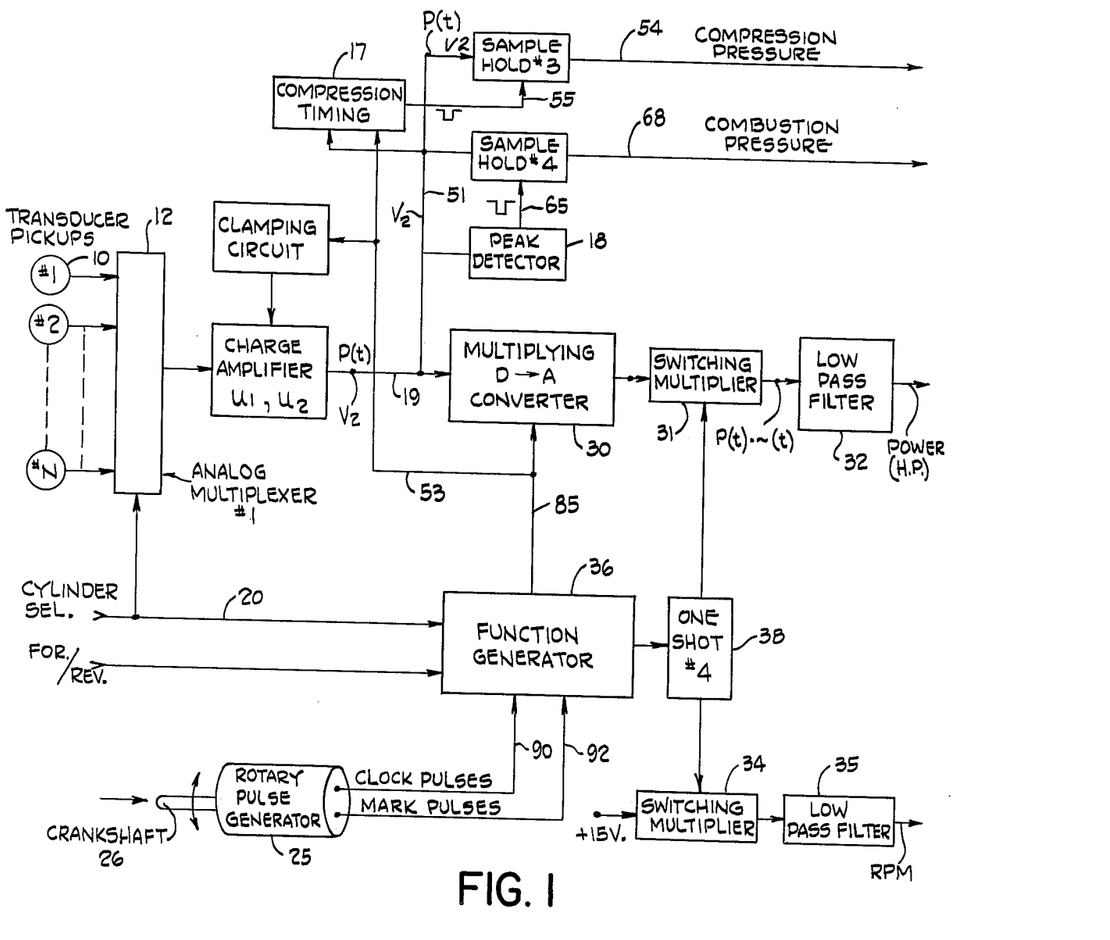
FIG. 1 is a block diagram of the measurement system of the present invention.

Referring now to the block diagram schematic of the present system as illustrated in FIG. 1, the measurement system is basically made up of three sections, namely:
 (a) Pressure measurement section;
 (b) Function generator section; and
 (c) Power and Revolutions Per Minute (RPM) section.

(a) Briefly, in the Pressure Measurement Section, piezoelectric transducers identified at 10 measure the pressure variations occurring in each engine cylinder. The output signals of these transducers are individually connected to and processed by a charge amplifier U1 and its associated clamping circuits so that the pressure variations are referenced to atmospheric pressure. An analog multiplexer 12 determines which individual transducer identified at #1, #2 ... #n will drive the charge amplifier U1 as instructed by the cylinder select signal line 20. The charge amplifier output signal, labeled P(t), is a positive voltage whose magnitude represents the absolute cylinder pressure.

A Sample-Hold device #3 is operable just before ignition of the cylinder under examination by a "compression timing" circuit identified at 17 such that the amplifier output P(t) being measured at that instant is a close approximation to the actual compression pressure of the cylinder being then monitored.

Another Sample-Hold device #4 is operable by a "peak detector" circuit identified at 18 at the instant when the output signal P(t) is maximum, to provide a signal output equal to the combustion pressure of the cylinder being then monitored.

(b) The purpose of the Function Generator Section is to develop values for piston velocity versus crankshaft angle of rotation, based on a unit angular frequency, i.e., a normalized velocity function. At other angular frequencies, we simply multiply the normalized velocity times the angular frequency value, to thus arrive at the true piston velocity.

To accomplish this, a rotary pulse generator 25 is connected to a shaft 26 which rotates with the engine crankshaft. Two output signals are generated by this pulse generator 25, i.e. a "MARK" pulse which appears once per crankshaft revolution and a "CLOCK" pulse waveform which is a series of 512 pulses generated per each crankshaft revolution. The pulse generator 25 is connected to the engine crankshaft so that the "MARK" pulse coincides with the "Top Dead Center" of the #1 piston. All other pistons will reach their "Top Dead Center" according to the prearranged firing order of the particular engine as will be understood. By counting "CLOCK" pulses it is possible to predict when each piston reaches its "Top Dead Center" position as well as its "Bottom Dead Center" (BDC) position. The 512 "CLOCK" pulses waveform produces 256 values of normalized velocity, per engine shaft revolution, which have been stored in a "Read Only Memory" (ROM) of the Function Generator 36, the purpose of which will be later described.

(c) The Power and RPM Section determines the power generated by the engine and which entails the multiplication of the cylinder pressure P(t) and the normalized velocity by the two quadrant multiplying DAC (digital to analog converter) as identified at 30. The cylinder pressure signal P(t) is applied to the DAC converter 30 reference input terminal (R) while the normalized velocity signal in the ROM of the Function Generator 36 is fed to the DAC converter 30 logic inputs in a manner to be later described. The signal output from the DAC converter 30 is then multiplied by the angular frequency in a "Switching Multiplier" 31 and finally sent through a Low Pass Filter 32 to provide a signal representing power generated by the cylinder being monitored.

Measurement of engine shaft revolutions per minute (RPM) is accomplished with the use of a similar Switching Multiplier 34 and Low Pass Filter 35 combination circuitry. As will be hereinafter described, the RPM and angular velocity of the engine shaft are basically proportional to the frequency of the "CLOCK" pulses generated by the Pulse Generator 25.

The "CLOCK" and "MARK" pulses are applied to the Function Generator 36, the output signal of which drives a "one-shot" switching circuit 38, the output of which then triggers the switching multiplier 34. The output signal of said multiplier is sent through the Low Pass Filter 35 to provide a signal output that is representative of the RPM of the engine shaft.

Figure 2:
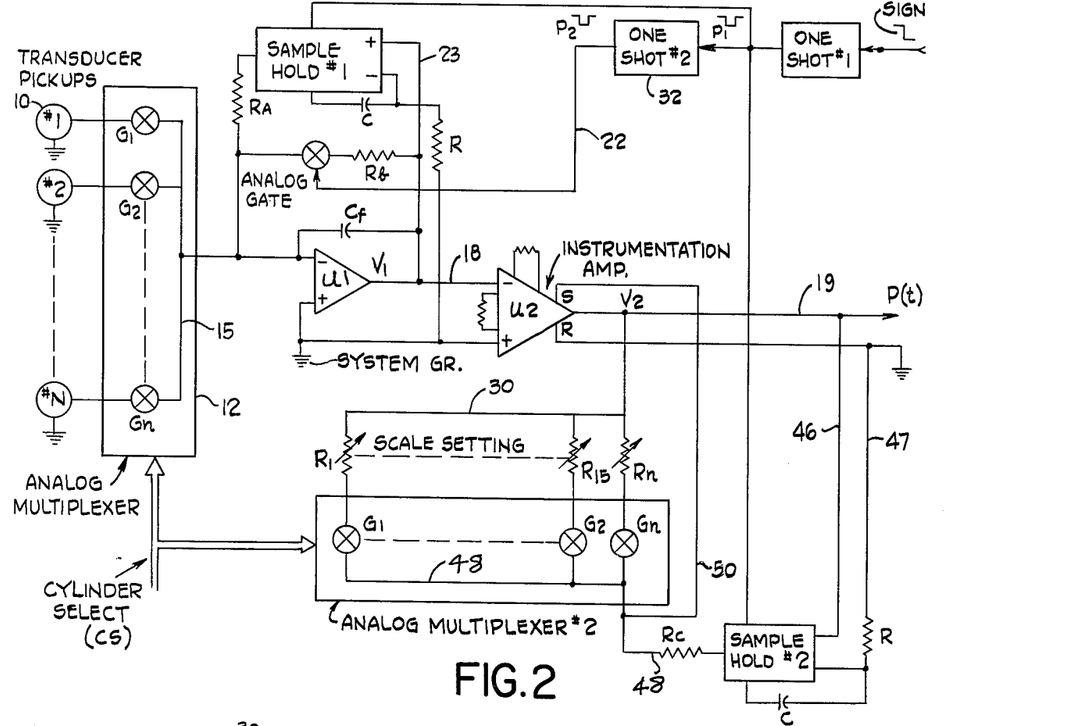
FIG. 2 is a schematic diagram of the input portion of the system and including the 16 channel charge amplifier and its associated clamping circuits.

With reference now directed to FIG. 2, the Pressure Measurement Section of the present system is operable to monitor and measure the absolute cylinder pressure of each cylinder as well as the compression pressure and combustion pressure of each cylinder. For this purpose, the Pressure Measurement Section includes the piezoelectric transducers 10, each of which is identified by a numeral #1, #2 ... #N which corresponds to the cylinder to which it is individually connected in a n cylinder engine. There is one transducer for each cylinder. Each transducer is responsive to a change in the respective cylinder pressure to provide a charge signal Q characteristic of said pressure change. In practice, a Columbia Research Laboratories transducer, Model No. SD-149-C has been satisfactory for the present system.

Each of the transducers 10 (#1, #2 ... #N) is separately connected to the input of an n channel analog multiplexer 12 which, as known, in operation represents a plurality of on-off switches $G_1$, $G_2$ ... $G_N$ connected in the present system in parallel by conductor 15 on one switch side and the other side of each switch being individually connected to one end of the transducers 10. One switch is provided for each transducer. A satisfactory multiplexer unit for use herein is manufactured by Analog Devices, Semiconductor Division under its Catalog No. AD7506KD.

The multiplexer output is connected by conductor 16 to the negative (−) terminal of Charge Amplifier U1. And, as shown in FIG. 2, the positive (+) input terminal of amplifier U1 as well as the housing of each transducer is connected to the engine ground.

The output terminal of charge amplifier U1 is connected by conductor 18 to the negative (−) input terminal of an instrumentation amplifier U2.

A commercially available instrumentation amplifier manufactured by Analog Devices, Inc. Model No. AD 521 has been found satisfactory for use herein as the amplifier U2.

Figure 6A:
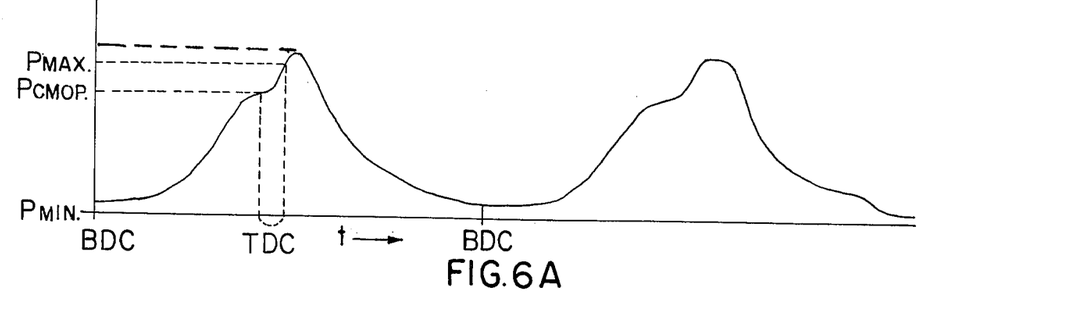
FIG. 6A is pressure waveform of the engine cylinder versus time.

The graph of FIG. 6A illustrates a typical absolute cylinder pressure waveform per piston cycle vs. time and indicates that the cylinder pressure is minimum when the piston is at the bottom dead center (BDC) and gradually increases exponentially to a higher magnitude or level identified as the compression pressure level (P comp.) whereat a slight dwell then occurs. Thereafter, the cylinder pressure continues to increase as the piston moves upwardly in the cylinder until it reaches its maximum magnitude in Peak Pressure (P max) which occurs at the instant the piston reaches Top Dead Center (TDC).

Fuel is normally injected into the cylinder at the compression pressure level (P comp.), and ignition occurs in the time period between P comp. and P max to initiate the power stroke of the piston cycle.

The cylinder pressure begins to decrease exponentially as the piston is moved into and through its power stroke and thus continues until the piston is again at Bottom Dead Center (BDC).

As shown in FIG. 6A, the cylinder pressure vs. time curve is repetitive per cycle of each piston movement.

Each transducer is connected to its cylinder chamber, as for example transducer #1, is connected to cylinder chamber #1, and is responsive to the change in cylinder pressure $P(t)$ to provide a charge signal Q that is representative of the change in cylinder pressure $P(t)$.

And, when the piston of the cylinder is at Bottom Dead Center (BDC) the charge signal Q of the associated transducer is zero as aforementioned.

To determine the cylinder pressure (absolute) of each cylinder, as for example #1 cylinder, the #1 transducer as aforementioned generates a charge signal Q that is representative of the change in cylinder pressure and whose magnitude is determined by the equation:

$$Q = aP(t)$$

where
$a$ = charge sensitivity of transducer in coulombs per psi in the Columbia Transducer SD-149-C the charge sensitivity is 400p coulombs/psi.
$P(t)$ = cylinder pressure As viewed in FIG. 2 the charge signal Q of #1 transducer is applied through analog switch $G_1$ and conductors 15 and 16 to the negative (−) input terminal of the charge amplifier U1 wherein said charge is amplified to provide a voltage signal $V_1$ which is proportional to the magnitude of charge signal Q.

As seen in FIG. 2, amplifier U1 has two feedback circuits between its input and output terminals namely the first circuit being analog gate G and resistor $R_b$ in parallel with capacitor $C_f$ and the second feedback circuit being Sample-Hold circuit #1, resistor $R_a$ and One-Shot #1 circuit.

The purpose of the first feedback circuit comprising analog gate G, and resistor $R_b$ is to make the output voltage $V_1$ of amplifier U1 zero at the start of each cycle at the instant the piston in the cylinder under measurement is at Bottom Dead Center (BCD). In this manner, the amplifier U1 will always start its voltage swing at zero reference per each measurement cycle.

To accomplish this, the clamping circuit for the charge amplifier U1 includes a One-Shot circuit 32 identified as One-Shot #2 which has its one side connected by conductor 22 to the analog gate G. The One-Shot #2 may be a commercially available monostable multivibrator such as the manufactured by Advanced Micro Devices Inc. of Sunnyvale, California as Model No. AM 26L02/96L02.

Figure 3A:
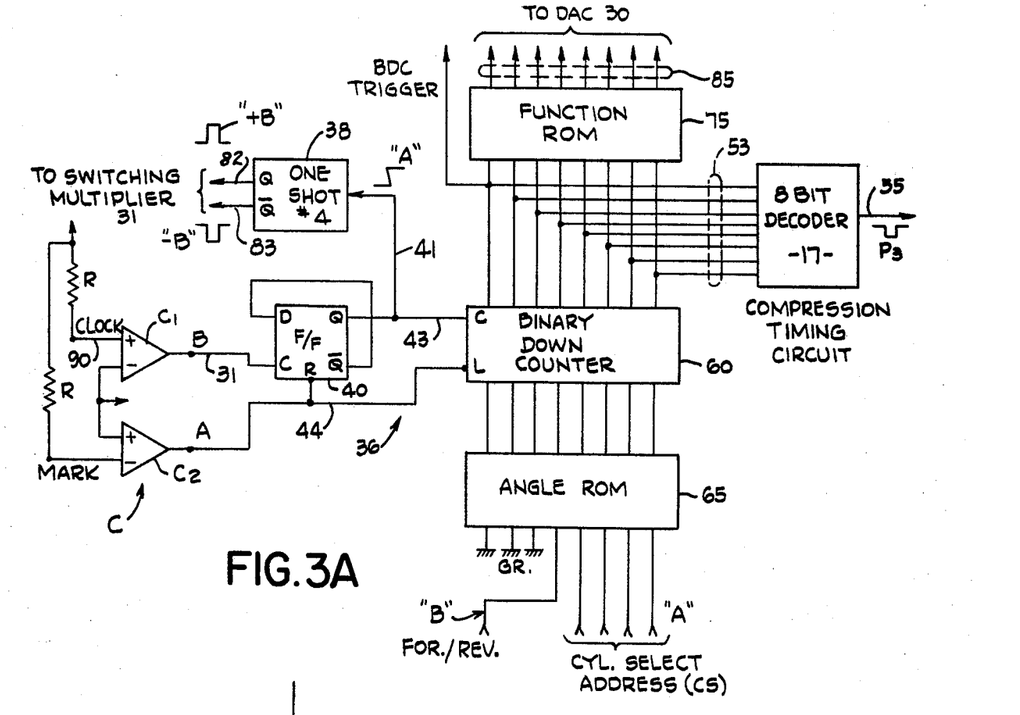
FIG. 3A is a schematic diagram of the Function Generator of the present measurement system and which develops the normalized velocity function based on the output of the rotary pulse generator and the address of the selected cylinder.

The input to the One-Shot #2 multivibrator is connected to the output of another One-Shot circuit identified as One-Shot #1 which may be the same multivibrator configuration as the One-Shot #2 multivibrator. One-Shot #4 multivibrator, identified at 38 in FIGS. 1 and 3A, is triggered by a conventional bistable multivibrator or flip-flop 40 which is a part of the Function Generator 36. Flip-flop 40 is triggered by the clock pulses generated by the rotary pulse generator 25 which, as aforesaid, generates a pulse train of 512 pulses per each revolution of the engine shaft 26.

As will be more fully understood hereinafter, a particular part of this 512 pulse train can be identified for each cylinder. For example, referring to a 16 cylinder engine, 16 clock pulses of the pulse train are generated by the rotary pulse generator 25 per each cycle per each revolution of the engine shaft 26. Similarly for an 8 cylinder engine 32 pulses of the pulse train represent each cylinder per engine shaft rotation.

Referring to FIGS. 1, 2 and 3A, the rotary pulse generator 25 generates the 512 clock pulses per each revolution of the engine crankshaft. The pulse train (512 pulses) is connected to comparator C, FIG. 3A of the Function Generator 36 FIG. 1, wherein its voltage swing is compared to 2.5 volts. This pulse train is then connected by conductor 31, FIG. 3A, to the C input terminal of flip-flop 40 wherein it is divided to produce an output pulse train "A" of 256 pulses.

This 256 pulse train "A" is connected by conductor 41 FIG. 3A to the input of One-Shot #4 (38) wherein it generates the output pulse train Q of constant width.

Figure 6B:
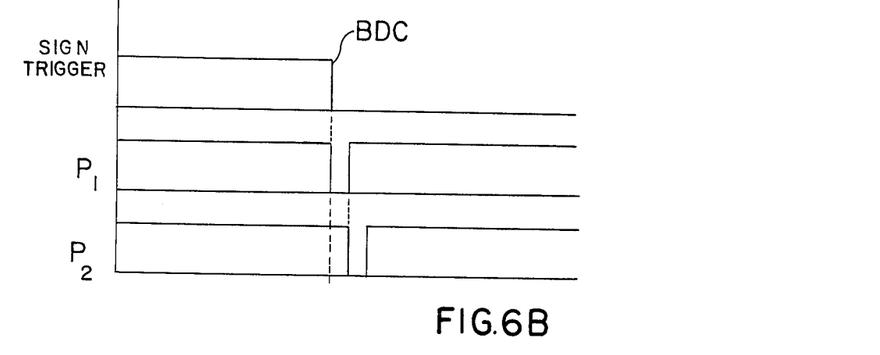
FIG. 6B is an illustration of the time relationship between several pulses generated by the present system.

For purposes of this description assume that we are looking at the #1 cylinder and that the BDC trigger FIG. 6B reprsents the instant the #1 piston reaches a BDC position.

When this particular pulse (BDC trigger) is applied to the One-Shot #1 a pulse $P_1$ is generated by the latter. At the termination of this pulse $P_1$, its rising trailing edge triggers the circuit 32 identified as One-Shot #2, which then triggers to generate pulse $P_2$.

As shown in the time diagram of FIG. 6B, the pulse signal $P_2$ is generated after pulse $P_1$ and after the pulse $P_{BDC}$ for the associated piston, i.e. #1 cylinder. However, pulse $P_2$ is generated while the #1 piston of the cylinder under examination is at its Bottom Dead Center position.

It will be recalled, that when the piston is at its BDC position, the charge signal Q of the associated transducer is also zero.

At this instant, the output voltage signal $V_1$ of the amplifier U1 is also zero. Pulse $P_2$ is connected by conductor 22 to analog Gate G and turns on the analog gate G and connects the resistor $R_b$ across the capacitor $C_f$ and the amplifier U1 input and output terminals. As a result, this zero voltage level is fed back through the feedback path $R_b$ and $C_f$ and clamps the amplifier U1 input to the output level, i.e., zero at the end of each cycle of piston movement, i.e., when said piston is at BDC.

Consequently, the voltage level of amplifier U1 is always at the same level at the start of each piston's cycle, i.e., zero level.

The second feedback circuit consisting of Sample-Hold circuit #1, resistor $R_A$ and One-Shot #1 circuit operates in the manner now to be described to prevent the amplifier U1 operating level from drifting as a result of bias or circuit leakage currents in the circuits associated with the negative input terminal of said amplifier U1.

Figure 7:
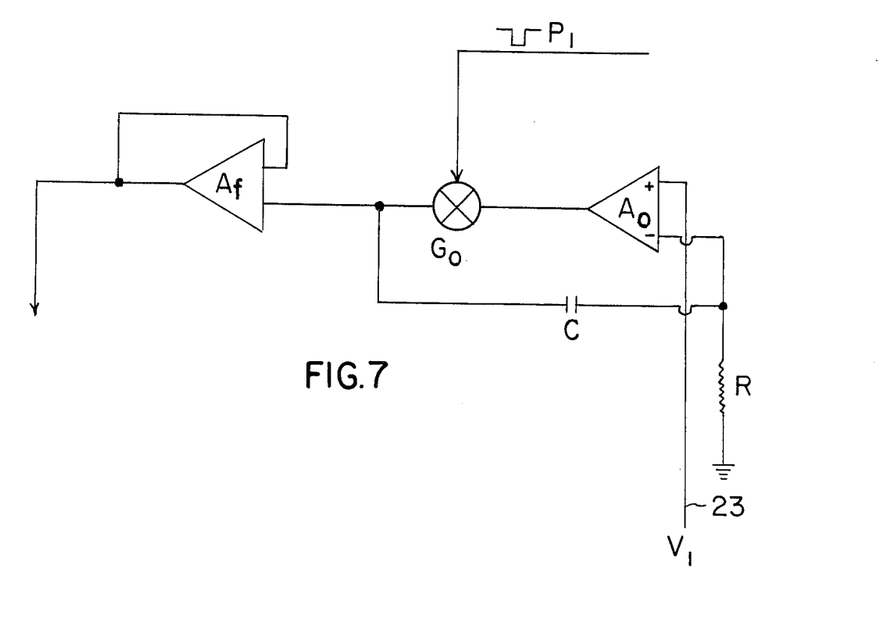
FIG. 7 is a schematic of a Sample-Hold circuitry used in the present system.

Referring to FIG. 2, the output terminal of amplifier U1 connects by conductors 23 to the positive (+) input terminal of Sample-Hold circuit #1 which is a conventional gated operational amplifier such as the Model HA-2420/2425 made by Harris Semiconductor, and which amplifier is shown in its circuit configuration in FIG. 7.

This Sample-Hold #1 circuit of FIG. 7 consists of a high performance operational amplifier $A_o$ with its output connected in series with an ultra-lower leakage analog switch $G_o$ and a MOSFET input unity gain amplifier $A_f$. In operation, with the external capacitor C connected to the output of switch $G_o$, the capacitor C will be charged to the level of the signal output of amplifier $A_o$. Likewise, with switch $G_o$ closed the signal output of amplifier $A_o$ is applied to the input of unity gain amplifier $A_f$.

When the switch $G_o$ opens, the capacitor is connected to the input terminal of amplifier $A_f$ whereupon the output signal level of said amplifier $A_f$ remains at its last level when switch $G_o$ was previously closed.

As previously mentioned, the One-Shot #1 multivibrator is triggered to produce pulse $P_1$ which occurs at the instant when the voltage signal $V_1$ of amplifier U1 is approximately zero.

This pulse signal $P_1$ is applied to the analog switch $G_o$ of the Sample-Hole #1 circuit FIG. 7 and is effective to close said switch thus connecting amplifier $A_o$ and amplifier $A_f$ in series across the charge amplifier U1. This circuit thus acts as a feedback circuit which measures the amplifier U1 output level during P1 and develops a current through $R_A$ such as to minimize the U1 output level during succeeding revolutions. This sampling operation continues for the duration of the pulse $P_1$. When pulse $P_1$ terminates, analog switch $G_o$ is opened whereupon the amplifier $A_f$ continues to operate by reason of capacitor C connected to its input circuit and thus maintains its output at its previous signal level. This condition continues for the remaining period of time the piston of the cylinder under examination completes its next stroke. Thus, the amplifier U1 is rendered insensitive to any transients which may tend to cause it to drift.

The voltage output signal $V_1$ of the charge amplifier U1 FIG. 2 is connected by conductor 18 to negative (−) input terminal of the instrumentation amplifier U2 which is the second stage of the charge amplifier circuit wherein it is suitably amplified.

The instrumentation amplifier U2, FIG. 2, is a suitable commercially available monolithic amplifier with the added feature of two additional inputs, labeled S and R (Sense and Reference). Such an amplifier is made by Analog Devices Inc. and identified as its Model No. AD 521. In this amplifier a voltage applied to the R input terminal changes the output voltage $V_2$ by the same amount (addition) whereas a voltage applied to the S input terminal subtracts said voltage to provide a difference output voltage. In the present instance this amplifier function is used to obtain a zero output voltage ($V_2 = 0$ when $V_1 = 0$).

The output signal $V_2$ is intended to be an exact representation of the absolute cylinder pressure of the cylinder under examination.

To accomplish this, it is necessary to prevent any transient voltage signals from affecting the current Q signal output of the associated transducer, and to standardize the signal output Q of each transducer for each pressure input of its associated cylinder.

To accomplish the first requirement, the engine ground and the ground of each transducer and the measurement system are connected together to thus provide the complete system, i.e. engine and measuring system with a common system ground.

To accomplish the second requirement, a second analog multiplexer 48 identified as #2, FIG. 2, and which is like analog multiplexer #1 both on configuration an operation has one side of each of its representative series of switches $G_1, G_2 \ldots G_n$ connected in parallel by conductor 48 and which conductor is connected to resistance $R_c$. The opposite end of said resistance $R_c$ is connected to the output of Sample-Hold circuit #2 which is identical to the circuit configuration and operation of Sample-Hold circuit #1. The positive (+) or input terminal of said Sample-Hold #2 is connected by conductor 46 to output conductor 19 of the amplifier U2, and the negative (−) output terminal is connected through resistor R and conductor 47 to instrument ground.

The opposite end of each of the representative switches $G_1, G_2 \ldots G_n$ of the multiplexer #2 is connected to one end of a variable rheostat $R_1, R_2 \ldots R_n$ there being one rheostat for each switch. The opposite ends of said rheostats are connected in parallel by conductor 30 and which conductor is connected at its opposite end to the output terminal of amplifier U2. Conductor 50, FIG. 2, is seen to connect at one end to the junction between the switch $G_n$ and resistance $R_c$ of the Sample-Hold #2 circuit, and the opposite end of said conductor 50 connects to the S terminal of amplifier U2.

With this circuit, the output of amplifier U2 can be set to provide the same magnitude of signal output $V_2$ for each transducer so that the voltage signal $V_2$ is an exact representation of the absolute cylinder pressure of each cylinder under examination.

This is accomplished as follows.

It is assumed that the engine under examination is running normally with all cylinders operating properly.

With the present instrument connected to the engine as thus far described, the multiplexers #1 and #2 are switched to the #1 cylinder, i.e., switches $G_1$ of both units are in their closed position to connect the #1 transducer to the charge amplifier U1, and the multiplexer #2 to the amplifier #2.

A suitable measuring instrument such as an oscilloscope is then connected to the output of the amplifier U2, and the magnitude and swing of the voltage signal $V_2$ is noted and compared with a reading of a mechanical pressure calibrator.

The cylinder select control CS, as seen in FIG. 2, which may be a stepping switch or equivalent may then be operated to sequentially close multiplexer switches $G_1$ of each unit #1 and #2 as to sequentially connect the associated cylinders #1, #2 . . . #n to a measurement system. The magnitude of voltage signal $V_2$ is noted for each successive cylinder #1, #2 . . . #n, and if any one signal reading is different, its associated rheostat $R_1$, $R_2$ . . . $R_n$ may be adjusted to apply a correction voltage to the S terminal of amplifier U2. In this instance, resistance $R_c$ and the connected rheostat $R_1, R_2 \ldots R_n$ act with Sample-Hold circuit #2 to its ground connection as a voltage divider which provides the correction voltage and which is connected by conductor 50 to the S terminal of amplifier U2. Hence, the voltage output of amplifier U2 is initially made equal to the mechanical readings. Sample-Hold #2 is identical to #1 in its mode of operation and serves to correct for any temperature drift of $V_2$.

The voltage signal output $V_2$ of the amplifier U2 is therefore an exact representation of the absolute pressure of the connected cylinder under examination, and by connecting any suitable instrument to the amplifier output (conductor 19) the signal $V_2$ may be monitored and recorded so that any change thereto may be immediately noted and corrective measures may then be undertaken to correct the condition causing the said change.

For example, should one or more cylinders begin to decrease or increase in cylinder pressure, this change is immediately made known and steps can be immediately taken to determine the cause and to correct the same.

It is also desirable to be able to monitor and determine the compression pressure (P comp) for each cylinder as the same is brought under examination, the magnitude of which will indicate if any cylinder malfunction is present.

For this purpose, Sample Hold circuit #3 is utilized as identified in FIG. 1. This Sample-Hold circuit may be conventional in configuration being identical to the circuit configuration as illustrated in FIG. 7 with the exception that the resistor R is eliminated and the output of $A_f$ is connected to the − input of $A_o$. A suitable Sample-Hold circuit that is satisfactory in this use is Model HA 2420/2425 made by Harris Semiconductor.

In its use in the present system, as seen in FIG. 1, the Sample-Hold circuit #3 has its input connected by conductor 51 to the output of amplifier U2 whereby to receive the voltage signal output $V_2$ of said amplifier.

A compression timing circuit 17 has its output connected by conductor 55 to the switching input of Sample-Hold #3. Said timing circuit has its input connected by conductor 53 to the function generator 36 which, as shown in FIG. 3A, includes a Binary Down Counter 60. In the present system, the timing circuit 17 is a Bit Decoder which, in its present form, is an "8" Bit Decoder, the reason for which will be later explained.

In use, a Signetics Model SN74LS138 decoder has proven satisfactory.

In operation, and as will be more fully explained hereinafter, the timing circuit 17 is triggered by the rotary pulse generator 25 to provide a pulse signal $P_3$ for each cylinder at the instant the magnitude of the cylinder pressure reaches the compression pressure level, as identified in the waveform of FIG. 6A.

At this instant, pulse $P_3$ is applied through conductor 55 to the switching input of Sample-Hold circuit #3 which is operable in the same manner as Sample-Hold circuit #1 previously described to pass the voltage signal P(t) from the output of amplifier U2 which, at said instant of time, is an exact magnitude of voltage signal that is representative of the compression pressure level of the cylinder under examination.

By attaching the output conductor 54 of the Sample-Hold #3 circuit to a suitable instrument such as voltmeter or the like, the magnitude of the compression pressure may be indicated or recorded.

It is also desirable to measure the magnitude of the maximum cylinder pressure of each cylinder which will indicate the presence of any cylinder malfunction.

In the present system this is accomplished by the peak detector circuit 18 and the Sample-Hold circuit #4.

Figure 4:
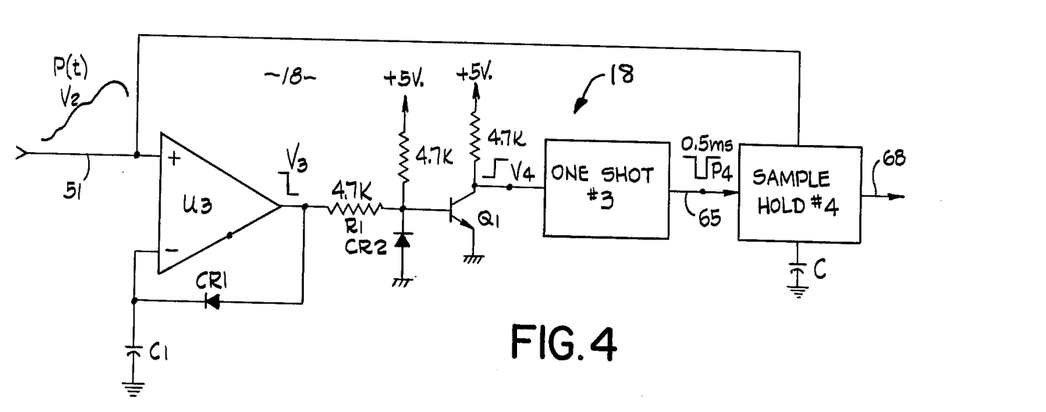
FIG. 4 is a schematic diagram of the Peak Detector and Combustion Pressure circuit which measures the engine combustion pressure.

The Sample-Hold circuit #4 is identical to the #3 Sample-Hold circuit and is seen to have its input switching terminal connected by conductor 65, FIGS. 1 and 4, to the output of peak detector circuit 18, as also seen in FIG. 4. The peak detector circuit 18 includes conventional operational amplifier U3 which has its positive (+) input terminal connected by conductor 51 to the output of amplifier U2 to thereby connect the voltage signal $V_2$ to the same.

As seen in FIG. 4, the amplifier U3 has its output connected through resistor $R_1$ to the base electrode of transistor inverter $Q_1$, the collector electrode of said inverter connecting to the input switching terminal of the One-Shot #3 circuit. Diode CR1 is connected between the output and input negative (−) terminal of amplifier U3 and acts as a feedback diode.

With the external circuitry connected to said amplifier U3 as shown, during the rising waveform $V_2$, output voltage signal of amplifier U2, the amplifier U3 also provides an output voltage $V_3$ which is also rising proportionately. During this interval, the diode CR1 is forward biased and performs the usual feedback function.

At the instant the voltage signal $V_2$ reaches its peak value, and as it then begins to fall or decrease, the diode CR1 becomes reverse-biased cutting off the feedback thereof, and the output of amplifier U3 immediately falls to a lower voltage level effective to produce pulse signal $V_3$ as shown in FIG. 4. This negative going pulse $V_3$ then passes through inverter $Q_1$ wherein it is inverted to a positive-going pulse signal $V_4$ which is then applied to the input terminal of One-Shot #3 multivibrator circuit which is identical to One-Shot circuit #1. One-Shot #3 circuit is thus triggered to produce pulse signal $P_4$ which is connected by conductor 65 to the input switching terminal of Sample-Hold #4 circuit.

At this same instant, Sample-Hold #4 circuit is turned on by pulse $P_4$ and passes the peak voltage signal $V_2$ to output conductor 68 whereby it may be connected to a suitable instrument indicator, read and recorded. As will be understood, the peak detector circuit 18 will be pulsed each time the voltage signal $V_2$ reaches its peak value whereby the Sample-Hold #4 circuit will thus be repetitively turned on to pass the peak voltage signal $V_2$ to its output terminal 68 each time said peak level is attained.

Figure 3B:
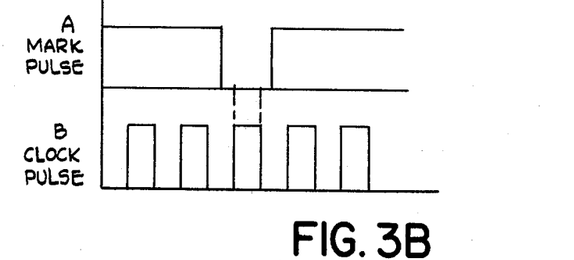
FIG. 3B is a time diagram showing the mark pulse and clock pulse input waveforms to the function generator.
Figure 3C:
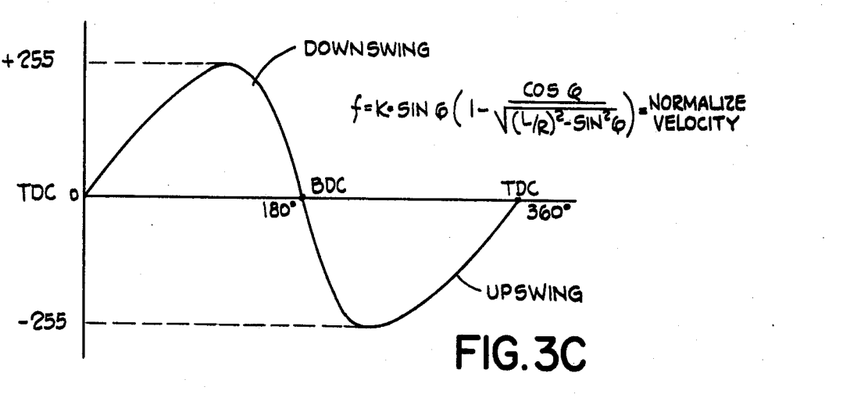
FIG. 3C is an illustration of the sine waveform representing the velocity function in ROM vs. crankshaft angle.

To measure Indicated Horsepower of each cylinder, reference is now directed to FIGS. 1, 3A and 3B.

It is therefore required that the present system is capable of selecting the particular cylinder for examination and to be able to measure the Indicated Horsepower of said cylinder.

As aforementioned, the rotary pulse generator 25, FIG. 1, generates a pulse train of 512 clock pulses and one mark pulse per each revolution of the engine shaft.

The clock pulse train output of rotary pulse generator 25 is connected by conductor 90 to the positive (+) input terminal of a comparator $C^1$, which is part of the Function Generator 36, and the mark pulse is applied by conductor 92 to the negative (−) terminal of second comparator $C_2$ to input of the Function Generator 36. The remaining input terminals of comparators $C_1$ and $C_2$ are seen to be connected to a +2.5 volt supply whereby said comparators are operable to clamp said pulse inputs to said voltage level and thus to "clean" up said pulse inputs as to provide precise square wave pulse outputs as seen in FIG. 3B.

The rotary pulse generator 25, as previously mentioned, is connected to the engine shaft, and said generator connection is made in the present embodiment of measurement system such that the mark pulse is generated at the instant the #1 piston is at its Top Dead Center (TDC) position within its cylinder. It will also be hereinafter realized that the generation of this mark pulse may be synchronized with any engine piston and the instant measurement system will be operable in the intended manner to determine Indicated Horsepower.

The purpose of the Function Generator 36 is to develop values for piston velocity versus crankshaft angle of rotation, based on a unit angular frequency, i.e., a normalized velocity function. At other angular frequencies, we simply multiply the normalized velocity times the angular frequency value, thus arriving at the true piston velocity. The rotary pulse generator 25 is connected so as to rotate in unison with the crankshaft. As aforementioned, two outputs are available from said generator, the "MARK" pulse appearing once per crankshaft revolution and the "CLOCK" pulse train or waveform which is a series of 512 pulses per revolution. The generator is connected to the crankshaft so that the "MARK" pulse coincides with the "Top Dead Center" position of the #1 piston. All other pistons will therefore reach their respective "Top Dead Center" position according to the prearranged firing order of the particular engine. By counting "CLOCK" pulses it is thus possible to predict when each piston reaches its Top Dead Center position.

As seen in FIG. 3A, the clock pulse train output from comparator C$_1$ is connected by conductor 31 to the input (C) terminal of flip-flop 40 which may be of conventional configuration, and which is operable as will be understood, to provide an output clock pulse train of 256 clock pulses per engine shaft revolution. This clock pulse train is connected by conductor 43 to the clock input "C" terminal of a Binary Down Counter of the Function Generator as is identified at 60.

The mark pulse output of comparator C$_2$ is connected by conductor 44 to the reset terminal of the flip-flop 40 being thus effective to regulate or time the reset of said flip-flop with the mark pulse. Said mark pulse output is also connected by said conductor 44 to the load input "L" terminal of the Binary Down Counter 60.

A suitable binary counter for use in the present system is Model AM93L66 (4-Bit) Binary Down Counter manufactured by Advanced Micro Devices Inc. of Sunnyvale, California. In the present system, it is desired to have an 8-bit binary output so two down counters are used so as to accommodate eight signal inputs from an Angle Read Only Memory Decoder/Drive Device (ROM) as indicated by the reference 65 which is also a part of the Function Generator 36.

As will be understood, the clock pulse train (256 pulses) input to the Binary Down Counter 60 is operable to trigger or step the counter down, each pulse input stepping the counter down one step.

The Binary Down Counter 60, FIG. 3A, as shown, has eight (8) output terminals which together provide 256 binary outputs (0–255) which correspond to the clock pulse train input (256 clock pulses) per each revolution of the engine shaft.

This counter 60 is thus able to provide a number (0–255) each of which corresponds to an instantaneous angular position of any piston with respect to the starting point of the clock pulse train, which for any present exemplary disclosure is at the instant the #1 piston is at its (TDC) position.

The Binary Down Counter 60 is connected to the input of a Function Read Only Memory (ROM) Decoder/Drive device identified at 75 in FIG. 3A.

A suitable (ROM) device which may be used is the present measurement system as Model 1103A 256-Bit Read Memory Decoder, Driver manufactured by Intel Inc.

The purpose of this Function ROM Decoder/Driver 75 is to accept the binary output of the Binary Down Counter 60 and to produce an output signal which represents the values of the normalized velocity of the piston of the cylinder under examination over one complete revolution. This is accomplished by referring to the angular position of the engine shaft with respect to the #1 piston at said instant of measurement. For example, when the #1 piston reaches its Top Dead Center (TDC) position, the mark pulse from the clock generator 25 is loaded into the Binary Down Counter as well as the clock pulse train which is connected to the clock (C) terminal of said counter.

Should the Angle Read Only Memory (ROM) Driver 65 be set for the #1 cylinder, as will be more fully explained hereafter, the output signal of the Function ROM Driver 65 is binary 0 when the #1 piston is at its TDC position.

The output signal of the Function ROM Driver 75 is represented by the following equation:

$$f_\phi = -R \cdot \sin\phi \left(1 - \frac{\cos\phi}{\sqrt{\left(\frac{L}{R}\right)^2 - \sin^2\phi}}\right)$$

where angle $\phi = \dfrac{\text{8 bit output of binary counter at the instant of measurement}}{256} \times 360°$ In this Function ROM Driver 75, each time each piston is at its Top Dead Center (TDC) or Bottom Dead Center (BDC) position the input angle signal is 0 binary.

By way of further illustration, assume the engine being monitored is a 12 cylinder engine, whereby the angular crankshaft relationship between adjacent pistons is 30°, and that the #12 cylinder is to be monitored and examined, and follows #1 cylinder in firing sequence. The #12 piston reaches its TDC position 30° of shaft rotation after said #1 piston.

As the #1 piston reaches the TDC position, the mark pulse of clock generator 25 is loaded into the Binary Down Counter 60 and, as aforementioned, the clock pulse train begins its count in.

However, the Angle ROM Driver 65 loads the Binary Down Counter output with a number corresponding to 30° phase difference between #1 and #12. The 30° angular crankshaft distance between adjacent cylinders of the 12 cylinder engine equals approximately 20 clock pulses in the 256 clock pulse waveform or train wherein each pulse represents 1.5° of crankshaft rotation.

Hence, when the #12 cylinder is to be examined, a pulse signal representing 20 clock pulses from the Angle ROM Driver 65 is loaded into the Binary Down Counter 60.

The Down Counter 60 then down counts beginning from this 20 pulse signal to binary 0 at which instant the #12 piston is at its Top Dead Center (TDC) position. When this occurs, the Binary Down Counter produces a delayed binary signal which is representative of the angle of the crankshaft between the #12 piston and #1 piston at the instant the #1 piston is at TDC position.

The Angle Read Only Memory Decoder/Driver 65 is similar to the Function ROM Driver 75 previously identified being modified, as shown in FIG. 3A, in that it has only four inputs at A also referred to as the Cylinder Select (CS) which can provide up to 16 inputs which are sufficient for a 16 cylinder engine.

An input terminal labeled B is used to insert a signal depending upon whether the engine is running forward or reverse to provide the proper sequence of input signals to the Angle ROM Driver 65.

The Cylinder Select (CS) may be connected to any suitable switching device (not shown) as for example a conventional rotary switch wherein a signal representing each cylinder may be selectively applied to the input of the Angle ROM Driver 65.

The purpose of the Angle ROM Driver 65 is to establish a binary 0 output in Binary Down Counter 60 at the instant the piston under examination is at its TDC position.

To accomplish this, the input to the Angle ROM Driver 65 is such as to provide an output therefrom that represents the angular distance between the #1 piston and the #n piston under examination. For instance, in the model above referred to, i.e., 12 cylinder engine, the angular crankshaft distance between adjacent cylinders is 30° or 20 pulses of the 256 clock pulse train input to the Binary Down Counter 60. And, assuming that the #12 cylinder is the next cylinder fired after the #1 cylinder, the output of the Angle ROM Driver 65 represents this 30° angular crankshaft distance or a 20 pulse count input to the Binary Down Counter 60. In like manner, it will be understood that if the next succeeding cylinder in firing order is #5 cylinder a 40 pulse count input is loaded into the Binary Counter 60 representing a 60° angular crankshaft distance between the #1 piston and the #5 piston. Other signal inputs to the Binary Counter 60 from the Angle ROM Driver 65 for the remaining cylinders of said 12 cylinder engine may be similarly determined.

The output signal from the Function ROM Driver 75 is then applied through conductor 85 as one input to the Digital to Analog Converter 30 as depicted in FIG. 1.

The voltage signal $V_2$ representing the cylinder pressure waveform $P(t)$ of the selected cylinder is connected by conductor 19 as the second input to the converter 30.

Converter 30 is then operable to multiply these two input signals ($P(t) \cdot f$(output of Function ROM 75)) to provide a value of power for each instant of measurement. In actual use a 12-Bit Digital to Analog Converter Model AD562 made by Analog Devices Inc. of Norwood, Massachusetts has been found satisfactory for use herein.

Figure 5A:
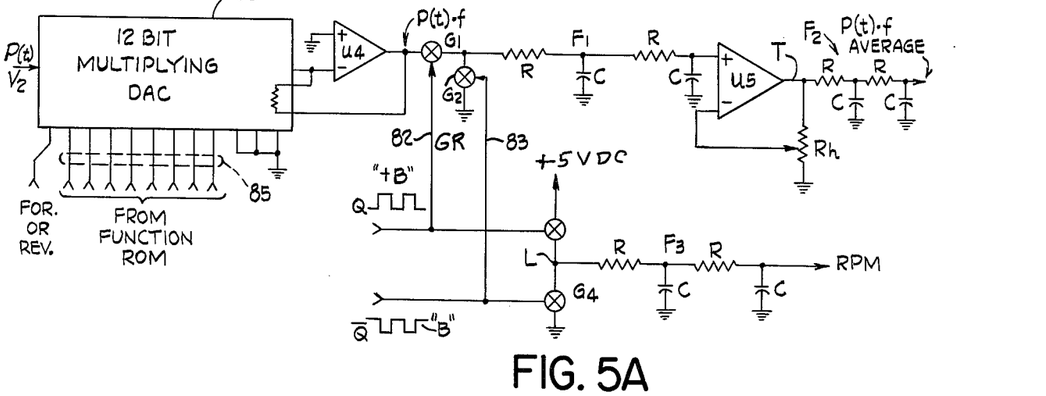
FIG. 5A is a schematic diagram of the multiplying circuits and associated low pass filters which develop the power and RPM analog output signals of the present measurement system.
Figure 5B:
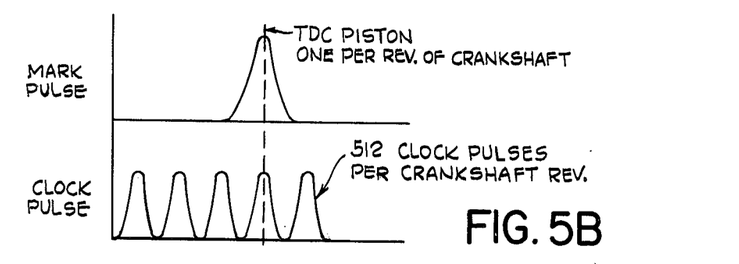
FIG. 5B is a waveform diagram of the mark and clock pulses generated by the rotary pulse generator of FIG. 1 with particular reference to the cycle of revolution of the engine shaft.

Referring to FIG. 5A, the converter 30 is connected to the negative (−) input terminal of amplifier U4 whereby the output of said converter 30 is suitably amplified. The output of said amplifier U4 is connected to switch $G_1$ of a switching multiplier pair, the output of said switch $G_1$ connecting to the input terminal point X of a filter unit identified at $F_1$.

The remaining switch $G_2$ of said multiplier pair is connected between terminal point X and system ground.

The One-Shot #4 multivibrator (38) has its square wave Q, $\overline{Q}$ outputs connected by conductors 82, 83 to switches $G_1$ and $G_2$. As seen in FIG. 3A, the One-Shot #4 is triggered by the Q output of flip-flop 40 which, in turn, is triggered by the output of comparator $C_1$. The output of flip/flop 40 is hence a 256 pulse train per revolution of the engine crankshaft, and when applied to the One-Shot #4, generates a pulse output at each output terminal Q and $\overline{Q}$ of a train of 256 square wave pulses of opposite sign and of constant width per each crankshaft revolution.

The positive (+) pulse train +B of output terminal Q is applied to the switch $G_1$ and the negative (−) pulse train (−B) of terminal $\overline{Q}$ is applied to switch $G_2$, and are effective to trigger said switches alternately to closed position which are operable to alternately connect terminal X, i.e., output of amplifier U4 to the input of filter unit F or to system ground.

As a result, each time, i.e. 256 times per crankshaft revolution, that the converter 30 and amplifier U4, are connected to the input (terminal X) of the filter unit $F_1$ an instantaneous voltage signal is generated whose value is $P(t) \cdot f$(Function ROM), which is the magnitude of the cylinder power at said instant of measurement, and which follows the $P(t)$ waveform as shown in FIG. 6A.

This voltage signal is then applied to filter $F_1$ wherein it is averaged to provide a voltage signal P(average) which is representative of the Indicated Horsepower of the cylinder under examination.

This voltage signal P(average) is then amplified by amplifier U5 and further filtered by filter unit $F_2$. The resultant voltage signal output P(average) is available at the output terminal T FIG. 5A which may be connected to any suitable readout such as analog type meter which may be calibrated to read Indicated Horsepower.

When the present system is initially installed, the amplifier U5 output is calibrated to provide a known voltage signal output for a given design horsepower output of the engine. For example, by knowing the engine design and operating parameters the engine can be set to run at a given RPM to provide the design horsepower as for instance 1000 HP. The voltage signal output at terminal T is then measured, and the values of the components R, C of the filter unit $F_2$, as well as the variable feedback rheostat $R_h$, can be selected to provide a standard or given magnitude voltage output signal for said horsepower which is then the reference voltage signal level for said system. Thereafter all voltage readings will be based upon this reference voltage signal level.

The Cylinder Select CS may be manually or automatically operated to trigger the Angle ROM Driver 65 for any preselected period of time whereby any predetermined cylinder may be monitored and examined for said time period.

Referring now to FIG. 3A the previously identified compression timing circuit 17 comprises an 8-bit Decoder which is connected to the output of the Binary Down Counter 60 through cable 53. This Decoder is operable as will be understood to recognize the presence of a particular binary number on the output of said counter 60.

This particular binary number is chosen to be the number which appears on the counter 60 output at the instant the piston in each cylinder reaches the compression pressure (P comp) level as depicted in FIG. 6A, the same binary number appearing on the output of said counter 60 during the monitoring and examination of each cylinder.

A suitable commercially available 8-Bit Decoder for use herein is Model No. SN74LS138 made by Texas Instruments or Signetics Inc., two of which comprise the 8-bit Decoder.

Upon the selected binary number appearing on the Decoder input, it is triggered to provide a pulse output as identified as $P_3$ which, as aforementioned, is connected through conductor 55 to the input of Sample-Hold #3 circuit whereby said circuit is triggered and passes the voltage signal $P(t)$ at that instant to its output and hence to output conductor 54 for connection to a suitable meter to indicate and record the same which is representative at said instant of the compression pressure of the cylinder under examination.

The present measurement system also provides a measurement of engine crankshaft RPM.

For this purpose, the pulse train input $Q$, $\overline{Q}$ from One-Shot #4 Multivibrator 38 is connected to a second pair of switching multipliers identified as $G_3$, $G_4$ FIG. 5A. As seen, said switching multipliers are connected between a suitable voltage source for example +15 volts D.C. and system ground.

A conventional R, C filter unit $F_3$ has its input—terminal L—connected between the switching multipliers $G_3$, $G_4$.

With this circuitry, the positive constant width pulse train Q is applied to the switching multiplier $G_3$ effective to trigger the same to its closed position for the duration of the pulse of said pulse train whereas the negative pulse train $\overline{Q}$ is similarly connected to switching multiplier $G_4$ and, in like manner, triggers said switching multiplier $G_4$ to its closed position.

The alternate closing of switching multipliers $G_3$, $G_4$ provides a pulse train output at terminal L the magnitude of which varies between +15 volts D.C. and ground depending upon the cyclic rate of opening and closing said switch multipliers $G_3$, $G_4$. This pulse train output signal is passed through filter unit $F_3$ whereby said voltage signal is averaged and is representative of the crankshaft RPM.

At the initial installation of the present measurement system, the engine is run at a known RPM, and the magnitude of the output voltage signal from filter unit $F_3$ is noted. The width of the pulse output of One-Shot #4 is adjusted to give a desired magnitude of voltage signal. Thereafter, the magnitude of said voltage signal will vary directly to a change in the engine RPM. Any suitable instrument connected to said output voltage signal may be used and calibrated in RPM to provide a direct reading in RPM.

It is now realized that the Function Generator 36 of the present system operates to automatically synchronize the measurement of the parameters herein described for any selected cylinder, i.e., Indicated Horsepower, Combustion Pressure and Compression Pressure with the response provided by the transducer of the selected cylinder.

Having thus described one embodiment of measurement system of the present invention it will now be realized that said system, when connected to an engine, is operable to provide Indicated Horsepower per cylinder, Cylinder Compression pressure, Cylinder Peak pressure and engine crankshaft RPM.

What is claimed is:

1. An electronic measurement system for monitoring and measuring the operating parameters of a multi-cylinder engine having a cyclically drivable member connectable to all pistons of said engine, comprising transducer means for sensing the internal cylinder pressure in each cylinder of said engine and providing a first signal representative of the change in pressure therein, first circuit means for providing a first voltage signal proportional to the pressure changes in a selected cylinder under examination, first switch means connected between said transducer means and first circuit means for sequentially connecting the transducer means of each selected cylinder to said first circuit means to enable the selected cylinder examination whereby said first voltage signal is provided for each said selected cylinder, second circuit means in circuit with said first circuit means and operable to sample the first voltage signal at predetermined intervals of time and to develop a second voltage signal which is applied to the first circuit means effective to modify the first voltage signal so that it is proportional to absolute pressure, means for continuously sensing the relative angular position of the drivable member and to provide a second signal which is indicative of said angular position, third circuit means connected to said sensing means for developing a third digital signal representative of the linear velocity of the piston of the selected cylinder, fourth circuit means connected to said first circuit means for multiplying the first voltage signal by the third digital signal to develop a fourth signal that is representative of the instantaneous horsepower of the selected cylinder, and fifth circuit means connected to said fourth circuit means for averaging the fourth signal and to provide a second voltage signal that is representative of the indicated horsepower of the selected cylinder.

2. An electronic measurement system as is defined in claim 1 and wherein the means providing the second signal includes first signal amplifying means.

3. An electronic measurement system as defined in claim 1 and wherein the means to provide the third signal comprises clock means generating a plurality of pulses in a predetermined pattern, each of said pulses representing a certain progression of movement of the drivable member.

4. An electronic measurement system as is defined in claim 3 and wherein the clock means is interconnectable to the drivable member and operable to sense the cyclic movement thereof.

5. An electronic measurement system as is defined in claim 1 and wherein the third circuit means includes means for synchronizing the first signal with said third digital signal.

6. An electronic measurement system as defined in claim 1 and which system includes means for sensing the position of the movable drivable member at the instant the internal engine pressure reaches its compression pressure level.

7. An electronic measurement system as defined in claim 1 and which system includes means for sensing the position of the movable drivable member at the instant the internal engine pressure reaches its combustion pressure level.

8. An electronic measurement system as is defined in claim 1 and which includes means to determine the rate of cyclic movement of the drivable member.

* * * * *